United States Patent [19]
Colombo

[11] Patent Number: 6,112,890
[45] Date of Patent: Sep. 5, 2000

[54] PACKAGING SYSTEM FOR PRESERVING PERISHABLE ITEMS

[75] Inventor: Edward A. Colombo, Penfield, N.Y.

[73] Assignee: Tres Fresh. LLC, Penfield, N.Y.

[21] Appl. No.: 09/342,844

[22] Filed: Jun. 29, 1999

Related U.S. Application Data

[63] Continuation-in-part of application No. 09/182,754, Oct. 29, 1998, and a continuation-in-part of application No. 09/196,450, Nov. 19, 1998.

[51] Int. Cl.$^7$ .................................................. B65D 81/20
[52] U.S. Cl. ..................... 206/213.1; 53/432; 426/124; 426/129
[58] Field of Search ............................. 53/432; 206/204, 206/213.1, 524.8; 426/118, 124, 129

[56] References Cited

U.S. PATENT DOCUMENTS

| | | | |
|---|---|---|---|
| 3,574,642 | 4/1971 | Weinke | 426/129 |
| 3,681,092 | 8/1972 | Titchenal et al. | 206/524.8 |
| 4,548,824 | 10/1985 | Mitchell et al. | 426/124 |
| 5,698,250 | 12/1997 | DelDuca et al. | 426/129 |
| 5,711,978 | 1/1998 | Breen et al. | 426/129 |
| 5,811,142 | 9/1998 | DelDuca et al. | 426/129 |
| 5,916,613 | 6/1999 | Stockley, III | 426/124 |
| 5,948,457 | 9/1999 | DelDuca et al. | 426/129 |

*Primary Examiner*—Jim Foster
*Attorney, Agent, or Firm*—Howard J. Greenwald

[57] ABSTRACT

A modified atmosphere package for storing oxygen sensitive goods which contains a a gas permeable tray for holding the oxygen sensitive goods, a gas permeable film positioned over and adjacent to the tray forming a wrapped tray, a barrier bag with an inside surface and an outside surface within which the wrapped tray is disposed, and a pressure relief valve located on the outside surface of the barrier bag. The tray contains foam material, at least about 20 volume percent of which is open cell foam with an average cell diameter of from about 0.001 to about 0.020 inches. A film of gas permeable material is disposed over and contiguous with the bottom wall of the gas permeable tray. The barrier bag has an oxygen permeability of less than 5 cubic centimeters per 100 square inches per 24 hours.

20 Claims, 5 Drawing Sheets

PACKAGING SYSTEM FOR PRESERVING PERISHABLE ITEMS

CROSS-REFERENCE TO RELATED PATENT APPLICATIONS

This application is a continuation-in-part of applicant's copending patent applications U.S. Ser. No. 09/182,754 (filed on Oct. 29, 1998) and U.S. Ser. No. 09/196,450 (filed on Nov. 19, 1998).

TECHNICAL FIELD

A packaging system for preserving perishable items which comprises a tray made from open-cell foam, a barrier bag enclosing said tray, and a pressure valve connected to said barrier bag.

BACKGROUND OF THE INVENTION

In U.S. Pat. No. 5,698,250 of Gary R. DelDuca et al., which is assigned to Tenneco Packaging Inc., a "modified atmospheric package" was claimed. This package contained " . . . an oxygen scavenger activated with an activating agent . . . . " According to the patentees, the oxygen scavenger is necessary because "Low-level oxygen systems relying upon evacuation techniques to diminish oxygen levels suffer from several disadvantages . . . the evacuation techniques render it difficult to remove any oxygen within a previously wrapped package such as an overwrapped meat tray . . . . The trapped oxygen raises the residual oxygen level in the package and can also cause billowing and subsequent damage to the package during evacuation" (see lines 3–15 of column 2 of this patent). The entire disclosure of this patent is hereby incorporated by reference into this specification. Furthermore, each of the prior art references cited during the prosecution of this patent are also hereby incorporated by reference into this specification.

The "modified atmospheric package" claimed in U.S. Pat. No. 5,698,250 includes a tray which, according to lines 27–31 of column 3 of the patent, " . . . is substantially composed of polystyrene foam and has a thickness ranging from about 100 mils to about 300 mils." According to lines 22–25 of column 3 of this patent, this tray " . . . is substantially permeable to oxygen . . . ."

U.S. Pat. No. 5,698,250 was based upon an application (U.S. Ser. No. 08/627,137) which was filed on Apr. 3, 1996. Thereafter, on Dec. 13, 1996, Gary R. DelDuca et al. filed another patent application (U.S. Ser. No. 08/763,719) which issued as U.S. Pat. No. 5,811,142 on Sep. 22, 1998; the entire disclosure of which (and all of the references cited therein) are hereby incorporated by reference into this specification. In this patent, the "tray 16" is also described as being " . . . substantially permeable to oxygen . . . ," and the "modified atmosphere package" claimed also requires the presence of an " . . . oxygen scavenger . . . ."

A third patent application (U.S. Ser. No. 08/856,448) was filed by Gary DelDuca et al. on May 14, 1997; it was referred to in International Publication Number WO 98/51168, the entire disclosure of which (and all of the prior art references cited therein) is hereby incorporated by reference into this specification. This patent application claims an oxygen scavenging package comprising an iron-based oxygen absorber and an oxygen uptake accelerator. The "oxygen scavenging packet 10" contains elemental iron, and it is preferably injected with a dilute solution of acetic acid to catalyze the oxidation reaction of iron. The use of this oxygen scavenger is expensive, often representing up to about 50 percent of the total cost of the entire "modified atmosphere package"; and it presents a risk of contamination of the meat disposed in the package by either the elemental iron, ferrous oxide, ferric oxide, acetic acid, and/or reaction products thereof. According to Nick H. Proctor et al.'s "Chemical Hazards of the Workplace" (Van Nostrand Reinhold, New York, 1988), acetic acid vapor " . . . is a severe irritant of the eyes, mucous membranes, and skin . . . " (see page 47), and iron oxide fume or dust, if inhaled, " . . . causes a benign pneumoconiosis (siderosis) . . . " (page 287). In the litigious society in which we live, the use of such oxygen scavenger package not only substantially increases the cost of the "modified atmosphere package" but also increases the likelihood of product liability litigation.

It would be desirable to produce a "modified atmosphere package" which did not require the presence of an expensive and potentially dangerous oxygen scavenger to prevent spoilage of the meat packed therein. Unfortunately, when the system of the DelDuca patents is used without the oxygen scavenger, the oxygen levels within the system are high enough to cause the meat to irreversibly brown (due to the formation of metmyoglobin), thereby rendering the meat unsaleable.

It is an object of this invention to provide a packaging system for preserving perishable items (such as meat) which does not require the use of an oxygen scavenger

SUMMARY OF THE INVENTION

In accordance with this invention, there is provided a packaging system for preserving a perishable item comprised of a tray comprised of open-cell foam, a bag enclosing said tray, and a pressure relief valve operatively connected to such bag.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
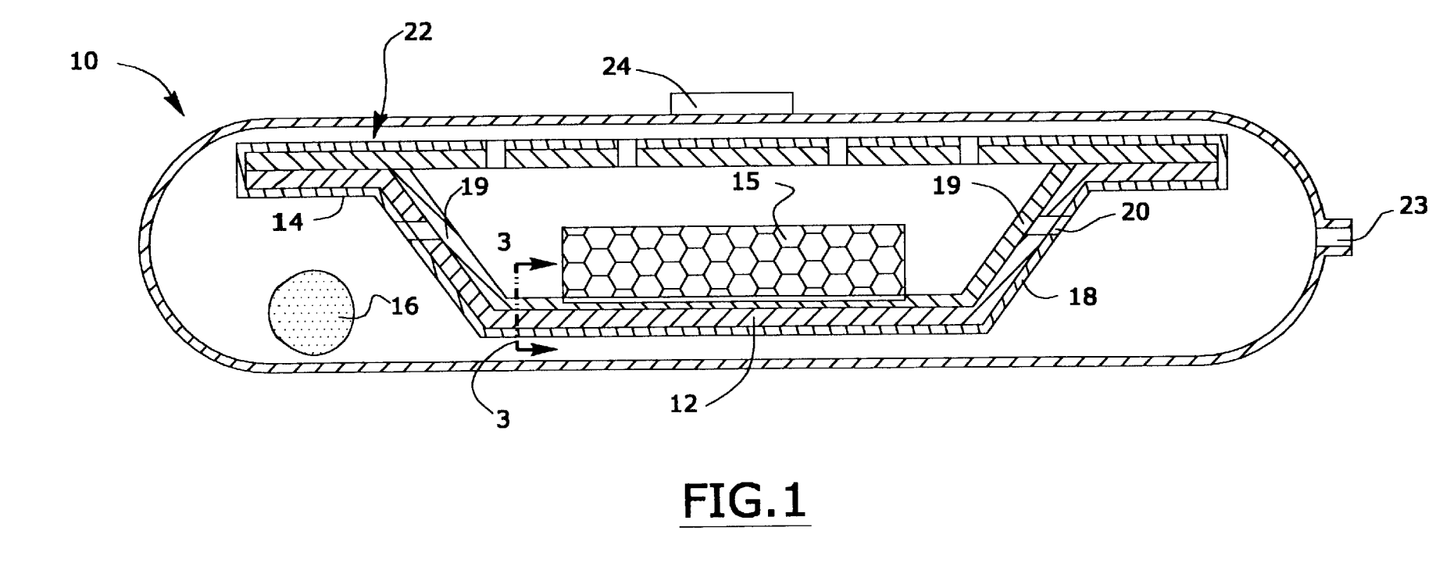
FIG. 1 is a sectional view of one preferred packaging system of the invention.

FIG. 1 is a sectional view of one preferred packaging system 10 which is comprised of a tray 12 which, in the preferred embodiment depicted, includes flanges 14 around the perimeter of such tray 12. A perishable good or goods 15 is disposed within tray 12.

The perishable goods which may advantageously be protected by the packaging system 10 of this invention include oxygen-sensitive food such as, e.g., red meat (veal, beef, pork, etc.), pasta, cooked food, and the like. Alternatively, one may preserve perishable non-food items such as photographic film, computer components, inorganic materials susceptible to oxidation, etc.

In the preferred embodiment depicted in FIG. 1, a skin layer 19 is contiguous with and attached to the bottom surface of the tray and preferably up the side of the tray to the flanges 14.

In the preferred embodiment depicted in FIG. 1, a gas permeable film material 18, which may include slits or perforations 20, covers the perishable goods 15. This skin layer 19 is llustrated more clearly in FIG. 3.

Referring again to FIG. 1, it will be seen that the tray 12 which is overwrapped with gas permeable film material 18 is disposed within a barrier bag 22 which surrounds the tray 12 and which preferably is made of a substantially impermeable material. This barrier bag is attached to a one-way valve 24, which will be described in greater detail elsewhere in this specification.

From about 10 to about 150 grams of solid carbon dioxide 16, which may be in the form a flakes, one or more pellets, an irregular shape, etc., are disposed outside of tray 12 but within barrier bag 22.

The barrier bag 22, prior to the time it is sealed, contains an opening 23.

Figure 2A:
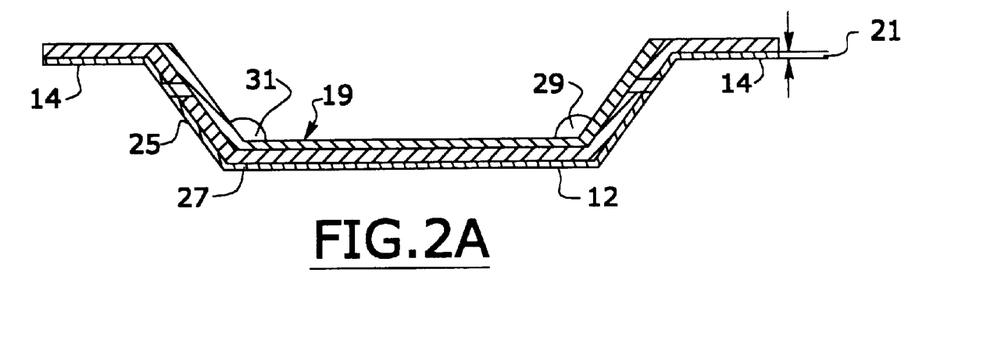
FIGS. 2A, 2B, 2C, 2D, and 2E, schematically illustrate one means of preparing and using the packaging system of FIG. 1.

FIG. 2A is a sectional view of tray 12 attached to skin layer 19. The tray 12 is comprised of at least 90 weight percent of foam material. In one preferred embodiment, the foam material is open-cell foam which contains at least about 20 volume percent of open cells.

As is known to those skilled in the art, an open-cell cellular plastic is a cellular plastic in which there is a substantial number of interconnected cells; see, e.g., A.S.T.M. D883. Reference also made by had to U.S. Pat. No. 5,798,409 (open cell foams of polystyrene and polyurethane), U.S. Pat. No. 5,784,845 (open cell foam material made from alkenyl aromatic polymer material), U.S. Pat. No. 5,646,193 (rigid open cell foam material), U.S. Pat. Nos. 5,557,816, 5,475,890, 5,434,024 (open cell foam material of polyvinyl chloride, or polyisocyanate, or polyphenol, or polypropylene), U.S. Pat. Nos. 5,348,587, 5,343,109, 5,239,723, 5,139,477 (polyethylene open cell foam material), U.S. Pat. Nos. 4,739,522, 4,395,342 (open cell foam material made from cellulose acetate, or phenol-formaldehyde, or cellular rubber), etc. The disclosure of each of these United States patents is hereby incorporated by reference into this specification.

It is preferred that the open cell foam material be made from a resin selected from the group consisting of polyethylene, polyvinyl chloride, polyacrylonitrile (such as the "BAREX" resin sold by the British Petrolem/Amoco company), poly(ethylene terephthalate), polystyrene, rubber-modified polystyrene, ethylenepolystyrene, interpolymers (such as "INDEX" interpolymers sold by Dow Chemical Corporation of Midland Mich.), polypropylene, polyurethane, polyisocyanurate, epoxy, urea formadehyde, rubber latex, silicone, fluropolymer or copolymers thereof or blends thereof, and in general any other suitable resin, resin mixture, or any foamable composition which can be made with an open cell structure such as, e.g., matrials made using a silane peroxide catalyst system (sold by the Sentinel Foam company or Hyanis, Mass.).

As is well known to those skilled in the art, one may vary the degree to which a foam material contains open-cell structure by the process taught by applicant in his 1977 article entitled "Controlling the Properties of Extruded Polystyrene Foam." This article was presented at the Proceedings of the International Conference on Polymer Processing, which was held at the Massachusetts Institute of Technology, Cambridge, Mass., in August 1977. This proceedings were published in 1977 in a book edited by Nam P. Suh and Nak-Ho Sung entitled "Science and Technology of Polymer Processing" (The MIT Press, Cambridge, Mass., 1977); and a description of means to control the concentration of open cells appeared on page 410 of this book. In particular, the correlation between the concentration of open cells produced in the foam and the melt temperature of the resin/blowing agent mixture used, was discussed.

Referring again to FIG. 2A, the tray 12 is comprised of foam material which contains at least about 20 volume percent of open cells. In one preferred embodiment, the foam material contains at least about 30 volume percent of open cells. It is even more preferred that the foam material contain from about 30 to about 90 volume percent of open cells and, even more preferably, from about 45 to about 90 volume percent of open cells. The extent to which a foam material contains open-cell foam may be determined by A.S.T.M. Standard Test D2856-94, "Test Method for Open-Cell Content of Rigid Cellular Plastics by the Air Pycnometer."

The open-cells in the foam contain a gas phase with gases which are substantially identical to the gases in ambient air. Thus, the open-cells generally contain a gas phase comprised of from about 19 to about 22 volume percent of oxygen (depending upon the altituide) and from about 78 to about 81 volume percent of nitrogen. In general, such gas phase contains from about 20.5 to about 21 volume percent of oxygen and from about 79 to about 79.5 volume percent of nitrogen.

FIGS. 2B, 2C, 2D and 2E illustrate how use the tray depicted in FIG. 2A to make the structure depicted in FIG. 1, For the sake of simplicity of representation, much of the detailed description of the tray contained in FIG. 2A has been omitted from FIGS. 2B, 2C, 2D and 2E.

Figure 2B:
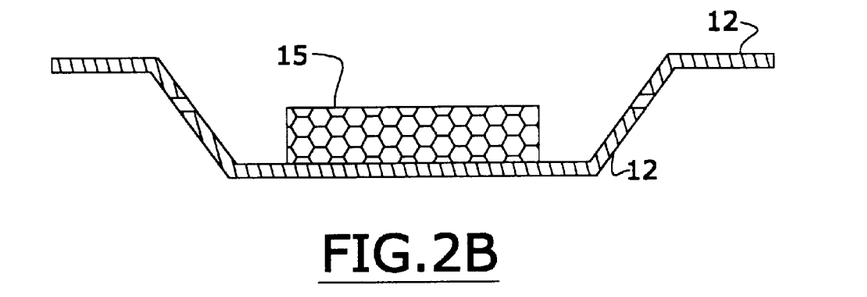
Figure 2C:
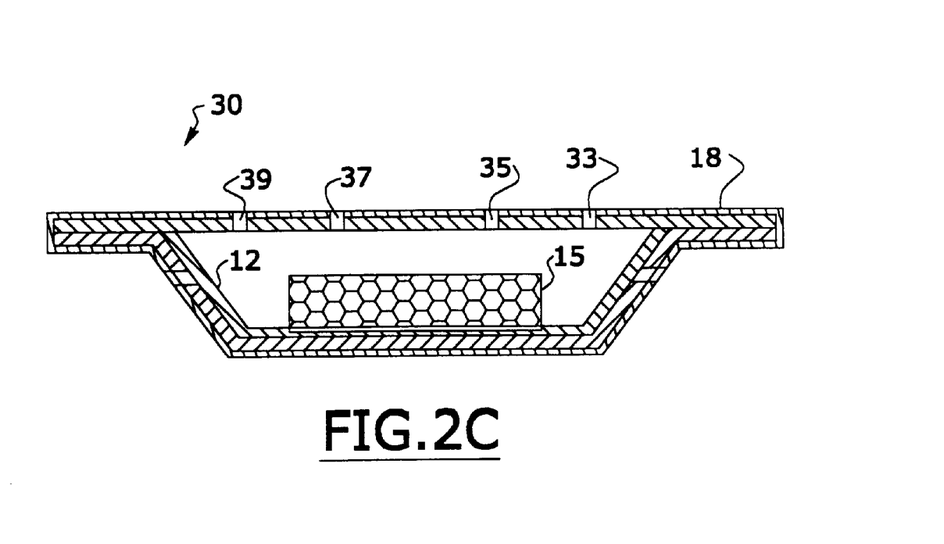

After the tray 12 has been fabricated (see FIG. 2A), the good or goods 15 are placed in the tray and then wrapped either manually or automatically with a gas permeable film material 18, or other suitable means, to holds the goods 15 in place, thereby forming wrapped tray 30 (see FIG. 2C).

The open-cell foam material which comprises tray 12 have as an average cell diameter of from about 0.001 to about 0.020 inches and, more preferably, from about 0.002 to about 0.008 inches. In preferred embodiment, the cell diameter of such cells is from about 0.003 to about 0.007 inches.

The average cell diameter of a foam may be determined in accordance with the procedure described in applicant's U.S. Pat. Nos. 3,953,739 and 4,329,052, the disclosures of which are hereby incorporated by reference into this specification. One may also use one or more of the methods disclosed in other United States patents, such as, e.g., U.S. Pat. Nos. 5,912,729, 5,817,704, 5,810,964, 5,798,065, 5,795,680, 5,790,926, 5,786,401, 5,770,634, 5,7532,717, 5,912,729, and the like. The disclosure of each of these United States patents is hereby incorporated by reference into this specification.

Referring again to FIG. 1A, the tray 12 has walls with a thickness 21 of from about 0.025 to about 0.350 inches and, preferably, from about 0.040 to about 0.15 inches. In one embodiment, the thickness 21 is from about 0.04 to about 0.1 inches. The thickness of the sidewalls 23 and 25 of tray 12 may be equal to or less than the thickness of the bottom surface 27 of tray 12. In one embodiment, the thickness of sidewalls 23 and 25 is from 25 to about 50 percent of the thickness of the bottom surface 27.

In one preferred embodiment, illustrated in FIG. 2A, the bottom surface 27 of tray 12 forms an interior angle (29 or 31) between sidewalls 23 or 25 of from about 10 to about 85 degrees and, preferably, from about 25 to about 50 degrees. Angles 29 and 31 may be the same or different.

Referring again to FIG. 2A, the tray 12 preferably has a density of from about 0.5 to about 15 pounds per cubic foot and, preferably from about 1 to about 10 pounds per cubic foot, and more preferably from about 1.5 to about 6 pounds per cubic foot. It is even more preferred that the density be from about 2.0 to about 5.0 pounds per cubic foot. In one embodiment, the density of tray 12 is from about 2 to about 3 pounds per cubic foot.

Referring again to FIG. 2A, it will be seen that tray 12 is attached to a skin 19; the means for attaching this skin 19 will be discussed elsewhere in this specification. The thickness of skin 19 is preferably from about 0.0005 to about 0.01 inches and, more preferably, from about 0.002 to about 0.005 inches.

In FIGS. 2B through 2E, tray 12 is depicted in various combination with other elements. However, for the sake of simplicity of representation, many of the details of tray 12 depicted in FIG. 2A have been omitted in these latter Figures.

As is illustrated in FIG. 2B, the perishable goods 15 are placed within tray 12, either manually or automatically. In one embodiment, not illustrated, an absorbent pad is placed between the goods 15 and the bottom of the tray in order to absorb excess juices exuded from the goods 15.

Referring to FIG. 2C, a gas permeable film material 18 adapted to pass both oxygen and carbon dioxide is wrapped around the entire tray 12. The film material may be adhered to the tray because of its "cling properties," and/or it may be heat-treated to cause it to adhere to the tray; in each either event, the film 18 is contiguous with the sides and the bottom of tray 12 and encloses the perishable goods 15. Thus, as is disclosed in U.S. Pat. No. 5,698,250, the film 18 may contain additives which allow the film to cling to itself. This film generally has a thickness ranging from about 0.5 mil to about 1.5 mils.

These gas-permeable films are well known to those skilled in the art and are described, e.g., in U.S. Pat. Nos. 5,888,597, 5,885,699, 5,852,152 (ethylene/vinyl acetate film and ethylene/acrylic acid film), U.S. Pat. Nos. 5,840,807, 5,839,593, 5,804,401, 5,780,085, 5,759,712, 4,056,639, 4,011,348, 3,867,558, 3,857,981, 3,728,135, and the like. The disclosure of each of these United States patents is hereby incorporated by reference into this specification.

In one preferred embodiment, film 18 is a polyvinyl chloride film supplied by the Borden Packaging and Industrial Products company of North Andover, Mass. as "Resinite." This film 18 has an oxygen permeability of from about 1100 to about 1400 cubic centimeters per 100 square inches per 24 hours, as measured by the Mocon Controls Oxtran 100 machine measured at 23 degrees Centigrade. The film has a carbon dioxide permeability of from about 12,400 to about 13,4000 cubic centimeters per 100 square inches per 24 hours as measured by a Linde Cell at 23 degrees Centigrade and 1 atmosphere pressure.

In the preferred embodiment depicted in FIG. 2C, film 18 is comprised of perforations 33, 35, 37, and 39. In this embodiment, it is preferred that each of such perforations have a maximum cross-sectional dimensional of less than about 0.05 inches. When such perforations are present, it is preferred that from about 1 to about 4 of them occur per square inch of surface.

Figure 2D:
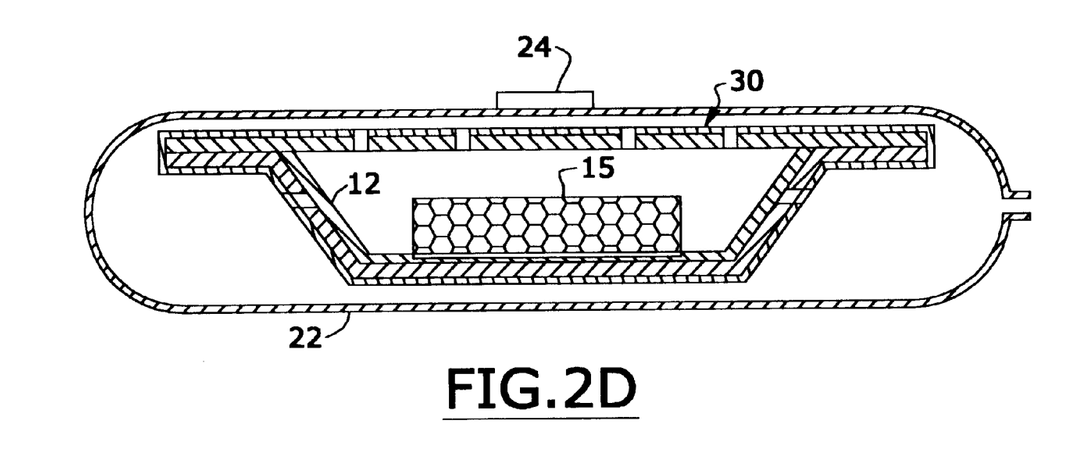

Referring to FIG. 2D, the wrapped tray 30 (see FIG. 2C) is wrapped in an oxygen barrier bag 22 which, in the preferred embodiment depicted, is preferably shaped similarly to a typical bag with an open end into which to insert the wrapped tray. Such oxygen barrier bags are well known to those skilled in the art and are described, e.g., in U.S. Pat. Nos. 5,862,947, 5,855,626, 5,811,027, 5,799,463, 5,798,055, 5,780,085, 5,753,182, 5,711,978, 5,700,554, 5,667,827, 5,583,047, 5,573,801, 5,573,797, 5,529,833, 5,350,622, 5,346,644, 5,227,255, 5,203,138, 5,195,305, 4,857,326, 4,605,175, 4,082,829, 3,953,557, and the like. The disclosure of each of these United States patents is hereby incorporated by reference into this specification.

In one preferred embodiment, the barrier bag described in column 4 of U.S. Pat. No. 5,698,250 may be used. This bag is commercially available as producnt number 325C44-EX861B from the PrintPak, Inc. company of Atlanta, Ga.

In another preferred embodiment, the barrier bag used is a biaxially oriented nylon film coated with an oxygen barrier coating (such as polyvinylidene chloride) and having a thickness of from about 0.00072 to about 0.00112 inches. Such a bag is commercially available from the Allied Signal Corporation (of New Jersey) as "Capron Emblem 1530" or "Capron Emblem 2530."

Regardless of the particular barrier bag used, it is preferred that it have an oxygen permeability of less than 5 cubic centimeters per 100 square inches per 24 hours, as measured by a suitable gas permeability measuring device, such as the aforementioned Mocon Controls Oxtran 100 machine; measurements are taken under ambient conditions. This test method is well know, being described in A.S.T.M. Standard Test D-1434 "Test Method for Determining Gas Permeability Characteristics of Plastic Film and Sheeting." Reference may also be had to U.S. Pat. Nos. 5,913,445, 5,882,518, 5,769,262, 5,684,768, and the like. The disclosure of each of these United States patents is hereby incorporated by reference into this specification.

Referring again to FIG. 2D, the barrier bag 22 is preferably operably connected to a pressure relief valve 24. The pressure relief valve 24 is adapted to open and allow gas disposed within barrier bag 22 when the pressure within barrier bag 22 is from about 0.05 to about 1.0 pounds per square inch gauge and, more preferably, from about 0.1 to about 0.2 pounds per square inch gauge. In an even more preferred embodiment, the valve 24 is adapted to allow gas disposed within barrier bag 22 to vent to the outside when the pressure within such bag is from about 0.12 to about 0.14 pounds per square inch gauge.

The valve 24, after it is has opened to vent gas from the barrier bag 22, closes when the internal pressure drops within the range of from about 0.01 to about 0.04 pounds per square inch gauge.

Pressure sensitive gas valves for releasing gas from a sealed flexible pouch, such as valve 24, are well known to those skilled in the art. See, for example U.S. Pat. Nos. 5,059,036, 5,419,638, 5,048,846, 4,653,661, 4,690,667, and the like. The disclosure of each of these United States patents is hereby incorporated by reference into this specification.

In one preferred embodiment, the pressure sensitive gas valve is sold by the Plitek, Inc. company of 681 Chase Avenue, Elk Grove Village, Ill. 60007; see, e.g., a publication by Plitek (entitled "Plitek Pressure Relief Valve") which was published on Jul. 8, 1991. A copy of this publication is in the file history of U.S. Pat. No. 5,419,638 of Mark D. Jamison.

The valve 24 may be incorporated into the gas barrier bag 24 by conventional means such as, e.g., by means of the "CCL Model 230 Valve Applicator labelling system" which is sold by CCL Industries of 3070 Mainway, Units 16–19, Burlington, Ontario L7M3X1. This system is adapted to be secured to the side of a vertical form-fill and seal machine to apply self-adhesive valve labels to the plastic web on the forming tube section of the machine just prior to the seal and cut station.

Referring again to FIGS. 2D and 2E, after the sealed tray 30 is disposed within the barrier bag 22, solid carbon dioxide 16 is charged into the barrier bag 22 prior to the time the bag is sealed. In general, from about 10 to about 150 grams of solid carbon dioxide is charged to barrier bag 22. For a description of one use of such solid carbon dioxide in a barrier bag without a valve 24, reference may be had to U.S. Pat. Nos. 5,731,023 and 5,737,905. The entire disclosure of each of these United States patents is hereby incorporated by reference into this specification. It should be noted that the amount of solid carbon dioxide used in the processes of these patents is substantially less than the amount of carbon dioxide generally used in applicant's process. In general, a sufficient amount of carbon dioxide is used to generate at least about 1.5 liters of gaseous carbon dioxide per kilogram of perishable goods 15; see, e.g., an article by N. Penney and R. G. Bell entitled "Effect of Residual Oxygen on the Colour, Odour and Taste of Carbon-Dioxide-Packaged Beef, Lamb and Pork . . . " published in Meat Science 33 (1993) at pages 245–252.

Figure 2E:
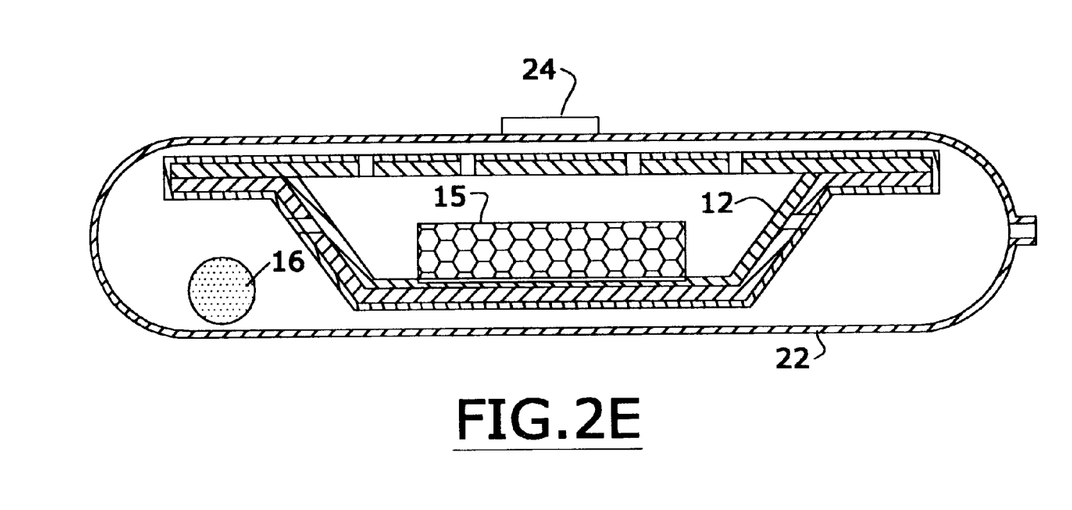

Referring to FIG. 2E, after the solid carbon dioxide is disposed within barrier bag 22, the bag is heat sealed by conventional means; see, e.g., U.S. Pat. Nos. 5,908,676, 5,799,463, 5,759,653, 5,332,121, and the like. The disclosure of each of these United States patents is hereby incorporated by reference into this specification.

In one embodiment, after the barrier bag 22 has been heat sealed, a vacuum is applied through valve 24 to remove air disposed within barrier bag 22.

Figure 3:
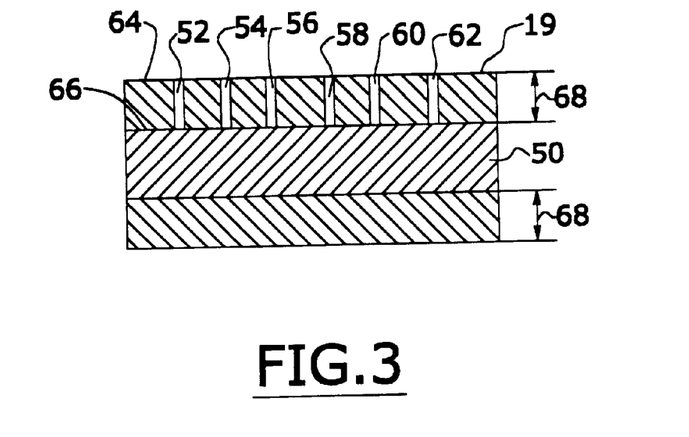
FIG. 3 is a sectional view of a portion of the tray used in the system of FIG. 1.

FIG. 3 is a sectional view, taken through line 3—3 of FIG. 1, of tray 12. Referring to FIG. 3, and to the preferred embodiment depicted therein, it will be seen that tray 12 is comprised of open cell foam 50 to which is attached a skin layer 19 which is preferably comprised of a multiplicity of through-holes 52, 54, 56, 58, 60, and 62. These through holes have a maximum dimension (such as a maximum diameter) of from about 5 to about 40 mils and generally extend from the top surface 64 of the skin layer 19 to the top surface 66 of the open cell foam layer.

In another embodiment, not shown, no such through holes exist in the skin layer 19. In either embodiment, however, the skin layer has a thickness 68 of from about 0.0005 to about 0.01 inches, and, preferably, from about 0.002 to about 0.005 inches.

As will be apparent to those skilled in the art, the structure depicted in FIG. 3 is a laminated structure with one or more skin layers 19 and/or 68. Means for producing such a laminated structure are well known. Thus, by way of illustration, in the process of Example 4 of U.S. Pat. No. 4,510,031, a 0.2 millimeter thick sheet of an ethylene/propylene block copolymer having a density of 0.91 was heat laminated to both surfaces of a foamed sheet. Thus, by way of further illustration, laminates made by bonding a skin layer to a foam core are described in U.S. Pat. Nos. 5,882,776, 5,876,813, 3,633,459, and the like. Thus, by way of even further illustration, U.S. Pat. No. 4,098,941 discloses a process in which a skin layer is formed in situ on a foam core by heat treatment. The disclosure of each of these United States patents is hereby incorporated by reference into this specification.

The skin layers 19 and/or 68 may be adhered to the foam layer 50 by adhesive means, by heat lamination means, by coextrusion, by mechanical means, and by other conventional means known to those skilled in the art. The skin layer 19 and/or the skin layer 68 may consist essentially of unfoamed plastic (such as polystyrene, or rubber-modified polystyrene, or polyethylene or polypropylene, mixtures thereof, and the like), paper, and the like. In another embodiment, the skin layer 19 and/or the skin layer 68 may consist essentially of either open cell foam and/or closed cell foam.

Without wishing to be bound by any particular theory, applicant believes that the laminated structure possesses substantially more flexural strength than the unlaminated foam core and, in many cases, reaches or exceeds the structural strength of an unlaminated closed cell foam core, such as the ones described in U.S. Pat. No. 5,698,250.

Extrusion process for making the foam tray 12

Processes for making closed cell polystyrene foam are well known to those skilled in the art. See, e.g., the following United States patents, each of which named the applicant as an inventor: U.S. Pat. Nos. 5,356,944, 5,286,429, 4,747,983, 4,329,052, 4,022,858, 3,953,739, 3,879,507, and the like. The disclosure of each of these United States patents is hereby incorporated by reference into this specification.

Processes for modifying closed-cell polystyrene foam processes to make open cell foam are also well known to those skilled in the art. See, e.g., the article by applicant entitled "Controlling the Properties of Extruded Polystyrene Foam" given at the Proceedings of the International Conference on Polymer Processing held at The Massachusetts Institute of Technology, Cambridge, Mass. in August of 1977 which was published in a book entitled "Science and Technology of Polymer Processing," edited by Nam P. Suh and Nak-Ho Sung (The MIT Press, Cambridge, Mass., 1977). Reference may also be had to U.S. Pat. Nos. 5,798,409, 5,784,845, 5,646,193, 5,557,896, 5,475,890, 5,434,024, 5,343,109, 5,239,723, 5,139,477, 4,739,522, 4,395,342, 4,259,373, 4,108,600, 4,107,876, 4,082,678, 4,079,170, 3,868,716, 3,844,286, 3,589,592, and the like. The disclosure of each of these United States patents is hereby incorporated by reference into this specification.

As is disclosed in these patents, the conventional process for making polystyrene foam, which is described in the aforementioned patents, uses the well documented extrusion process for producing cellular polystyrene foam in which a solution of a volatile blowing agent in molten polymer, formed in an extruder under pressure, is forced through an orifice into an ambient environment of temperature and pressure. The polymer simultaneously expands and cools under conditions that give it enough strength to maintain dimensional stability at the time corresponding to optimum expansion. Stabilization is due to cooling of the polymer phase to a temperature below its glass transition or melting point. Cooling is effected by vaporization of the blowing agent, gas expansion, and heat loss to the environment.

The polystyrene foam sheet thus produced is allowed to equilibrate with atmospheric gases for a period of from about 1 to about 5 days, at which time it is heat shaped into a container using conventional thermoforming equipment.

Figure 4:
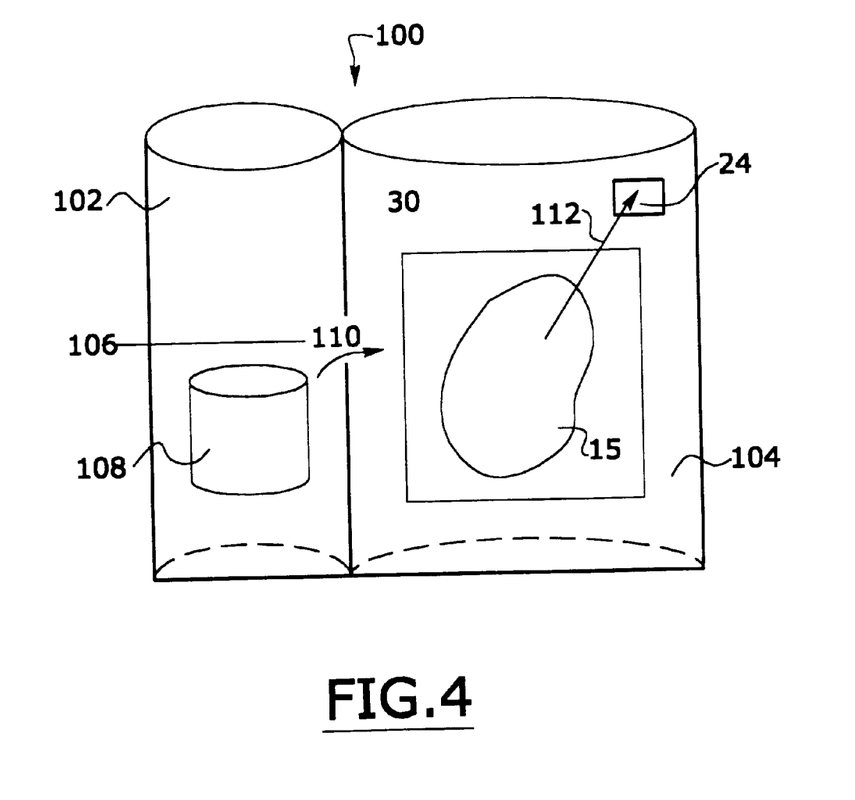
FIG. 4 is a sectional view of one preferred barrier bag which may be used in the packaging system of FIG. 1.

FIG. 4 is a schematic view of another system for preserving perishable goods in which a two compartment barrier bag comprised of compartment 102 and compartment 104 communicate with each other via an orifice 106. A chunk of solid carbon dioxide 108 gradually sublimes causing gas to travel via arrows 110 and 112 and, when pressure has built up, to vent through valve 24. The system of this FIG. 4 is very similar to the system depicted in FIG. 1, with the exception that it utilizes a two-compartment barrier bag rather than a single compartment barrier bag.

The following Examples are presented to illustrate the claimed invention but are not to be deemed limitative thereof. Unless otherwise stated, all parts are by weight and all temperatures are in degrees Centigrade.

EXAMPLE 1

An open cell tray similar in configuration to the open cell tray 12 depicted in FIG. 1 was used in this example. This tray had a length of 10.5 inches, a width of 7 inches, and a depth of 1.5 inches. It weighed 15.3 grams, had a thickness of its bottom wall of 0.14 inches, and had thickness of its sidewalls of 0.04 inches. This tray was made from polystyrene foam and contained 85 volume percent of open cells with an average cell diameter of 0.005 inches.

The tray also contained an skin layer 19 (see FIG. 1) which was a sheet of rubber-modified polystyrene film with a thickness of 0.001 inches. The skin layer 19 was extruded onto the bottom surface of the open cell foam. Thereafter, the skin layer was perforated with a multiplicity of perforations with an average diameter of 0.02 inches and an average density of such perforations of about 4 per square inch.

The tray was wrapped with a polyvinyl chloride film sold under the trade name "Resinite" by the Borden Packaging and Industrial Products company of North Andover, Mass. so that the film encased the entire tray. Thereafter, a multiplicity of performations corresponding in size and density to those made in the skin layer were made in that area of the polyvinyl chloride film overlaying the skin layer.

A gas barrier bag with dimensions of 10"×13" by 0.0025", which was purchased as "E-Z PAK High Barrier DELI Pouches" from the Koch company of Kansas City, Mo.) was fitted with a pressure sensitive gas valve obtained from the Plitek LLC company of 681 Chase Avenue, Elk Grove Village, Ill. Thereafter, 80 grams of solid carbon dioxide were charged to the barrier bag, the foam tray was then inserted into the barrier bag, and the barrier bag was then heat sealed.

The oxygen content within the barrier bag was periodically monitored using a Dansensor oxygen analyzer; a needle probe connected to such analyzer was periodically inserted into the barrier bag and a small sample (from about 1 to about 2 milliliters of gas) was withdrawn and analzyed.

Figure 5:
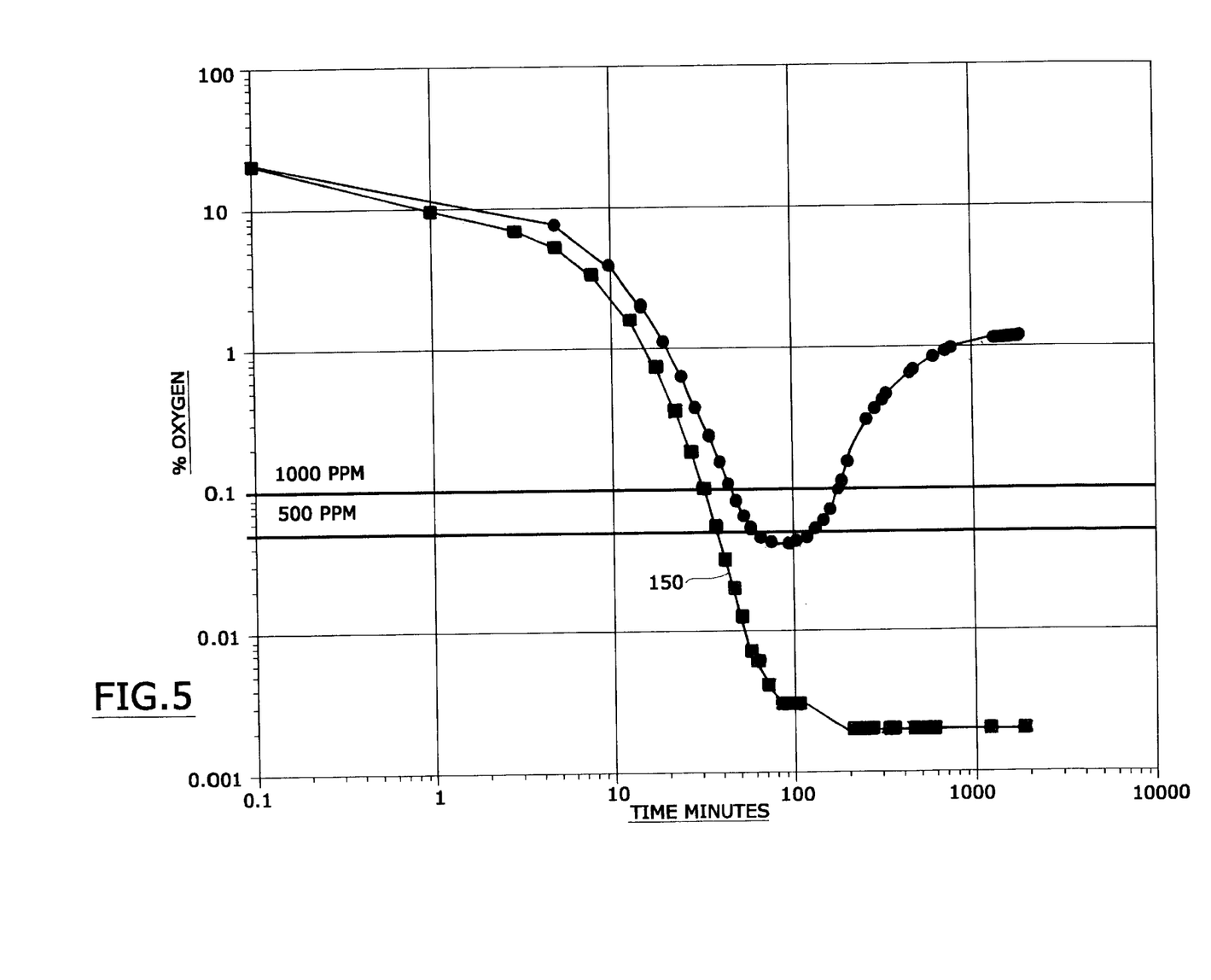
FIG. 5 is a graph illustrating the oxygen concentrations in a specified packaging material over time with two systems, one of which uses a conventional foam tray, and the other of which uses the open-cell foam tray of this invention.

The results of this experiment are illustrated in FIG. 5; see the graph labeled 150 with the rectilinear points plotted. At 1000 minutes time (16.7 hours), the oxygen content within the barrier bag of the packaging system of this Example was only 2 parts per million (0.002 percent).

COMPARATIVE EXAMPLE 2

The experiment of Example 1 was repeated, with the exception that a conventional foam tray with exactly the same dimensions as the foam tray of Example 1, was utilized. This foam tray contained at least about 95 volume percent of closed cell polystyrene foam; and it was similar to the conventional foam tray described in U.S. Pat. Nos. 5,698,250 and 5,811,142 of Gary DelDuca et al. The DelDuca et al. patents are assigned to the Tenneco Packaging Inc. of Evanston, Ill., who markets a system based upon the DelDuca patents under the name of the "ActiveTech" packaging system. The tray used in the system marketed by Tenneco is substantially identical to the tray used in this Example 2.

At 1000 minutes time (16.7 hours), the oxygen content within the barrier bag of the packaging system of this Example was 10,000 parts per million (1.0 percent), some 5,000 times as great as the oxygen content within the barrier bag of the packaging system of Example 1.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A modified atmosphere package for storing oxygen sensitive goods, comprising a gas permeable tray for holding the oxygen sensitive goods, a gas permeable film positioned over and adjacent to said tray forming a wrapped tray, a barrier bag with an inside surface and an outside surface within which said wrapped tray is disposed, and a pressure relief valve located on said outside surface of said barrier bag, wherein:
   (a) said gas permeable tray is comprised of foam material, wherein:
      1. at least about 20 volume percent of said foam material is open cell foam comprised of a multiplicity of open cells,
      2. said open cells comprise a gas phase which comprises from about 19 to about 22 volume percent of oxygen and from about 78 to about 81 volume percent of nitrogen,
      3. said open cells have an average cell diameter of from about 0.001 to about 0.020 inches,
   (b) said gas permeable tray is comprised of a bottom wall and at least one side wall integrally connected to said bottom wall and extending upwardly and outwardly from said bottom wall at an angle of from about 10 to about 85 degrees, wherein each of said bottom wall and said side wall have a thickness of from about 0.025 to about 0.350 inches,
   (c) said gas permeable tray has a density of from about 0.5 to about 15 pounds per cubic foot,
   (d) a film of gas permeable material is disposed over and contiguous with said bottom wall of said gas permeable tray, and
   (e) said barrier bag has an oxygen permeability of less than 5 cubic centimeters per 100 square inches per 24 hours.

2. The modified atmosphere package as recited in claim 1, wherein said film of permeable material is comprised of a multiplicity of perforations extending through said film.

3. The modified atmosphere package as recited in claim 2, wherein each of said perforations has a maximum cross-sectional dimension of less than about 0.05 inches.

4. The modified atmosphere package as recited in claim 3, wherein from about 1 to about 50 of such perforations are present in each square inch of said film of gas permeable material.

5. The modified atmosphere package as recited in claim 3, wherein from about 1 to about 4 of such perforations are present in each square inch of said film of gas permeable material.

6. The modified atmosphere package as recited in claim 1, wherein said gas permeable tray has a density of from about 1 to about 10 pounds per cubic foot.

7. The modified atmosphere package as recited in claim 1, wherein said film of permeable material is comprised of a multiplicity of slits extending through said film.

8. The modified atmosphere package as recited in claim 1, wherein from about 10 to about 150 grams of solid carbon dioxide are disposed within said barrier bag but outside of said wrapped tray.

9. The modified atmosphere package as recited in claim 1, wherein said foam material is polystyrene foam material.

10. The modified atmosphere package as recited in claim 1, wherein at least about 30 volume percent of said foam material is open cell foam comprised of a multiplicity of open cells.

11. The modified atmosphere package as recited in claim 1, wherein from about 45 to about 90 volume percent of said foam material is open cell foam material.

12. The modified atmosphere package as recited in claim 1, wherein said open cells have an average cell diameter of from about 0.003 to about 0.007 inches.

13. The modified atmosphere package as recited in claim 1, wherein said side wall has a thickness which is from about 25 to about 50 percent of the thickness of said bottom wall.

14. The modified atmosphere package as recited in claim 1, wherein said tray has a density of from about 2 to about 3 pounds per cubic foot.

15. The modified atmosphere package as recited in claim 1, wherein a said tray is comprised of an inner surface to which is attached a skin layer with a thickness of from about 0.0005 to about 0.01 inches.

16. The modified atmosphere package as recited in claim 1, wherein said pressure relief valve is adapted to open when the pressure within barrier bag is from about 0.05 to about 1.0 pounds per square inch gauge.

17. The modified atmosphere package as recited in claim 1, wherein said skin layer is comprised of a multiplicity of through holes.

18. The modified atmosphere package as recited in claim 1, wherein said skin layer consists essentially of unfoamed plastic material.

19. The modified atmosphere package as recited in claim 1, wherein said barrier bag is comprised of a first compartment and a second compartment adjacent to said first compartment and communicating with said first compartment by means of an orifice extending between said first compartment and said second compartment.

20. The modified atmosphere package as recited in claim 19, wherein solid carbon dioxide is disposed within said first compartment and said wrapped tray is disposed within said second compartment.

* * * * *